United States Patent
Tamura et al.

Patent Number: 5,926,310
Date of Patent: Jul. 20, 1999

[54] POLARIZING FILM AND POLARIZING COMPOSITES

[75] Inventors: Kanichi Tamura; Shoichi Mitsuuchi, both of Osaka, Japan

[73] Assignee: Talex Optical Co., Ltd., Osaka, Japan

[21] Appl. No.: 08/940,814

[22] Filed: Sep. 30, 1997

[30] Foreign Application Priority Data

Oct. 30, 1996 [JP] Japan ................................ 8-288207

[51] Int. Cl.$^6$ .................. F21V 9/06; G02B 5/30; G02B 27/28
[52] U.S. Cl. .................. 359/350; 359/352; 359/361; 359/490; 359/491; 359/493; 359/601; 359/722; 351/44; 351/49; 351/163
[58] Field of Search .................. 359/490, 491, 359/493, 501, 502, 601, 614, 350, 352, 361, 722, 723; 351/44, 49, 163, 165

[56] References Cited

U.S. PATENT DOCUMENTS

| | | | |
|---|---|---|---|
| 2,974,052 | 3/1961 | Bacon et al. | 359/361 |
| 4,149,780 | 4/1979 | Young | 359/491 |
| 4,311,368 | 1/1982 | Saito et al. | 351/165 |
| 4,878,748 | 11/1989 | Johansen et al. | 351/49 |
| 5,087,985 | 2/1992 | Kitaura et al. | 359/490 |
| 5,310,509 | 5/1994 | Okada et al. | 359/490 |
| 5,335,099 | 8/1994 | Smith | 359/361 |
| 5,400,175 | 3/1995 | Johansen et al. | 351/163 |
| 5,859,714 | 1/1999 | Nakazawa et al. | |

OTHER PUBLICATIONS

Makas et al; "Sunglass lenses and color fidelity"; Manufacturing Optician International; Nov. 1968 pp. 239–243.

*Primary Examiner*—Ricky D. Shafer
*Attorney, Agent, or Firm*—Wenderoth, Lind & Ponack L.L.P.

[57] ABSTRACT

A polarizing film or composite which can eliminate glare of the light reflected by an object and passing therethrough while maintaining the original color of the object. The polarizing film is color-adjusted so that the color coordinates L, a and b in the UCS color space, where L is the color brightness divided into 0 to 100 sections and in terms of tristimulus values X, Y and Z in the standard colorimetric system CIE, $L=100Y^{1/2}$, $a=175(1.02X-Y)Y^{1/2}$, $b=70(Y-0.847Z)y^{1/2}$, will be $22 \leq L \leq 70$, $-2.0 \leq a \leq 2.0$, $-2.0 \leq b \leq 2.0$, that the light transmittance in the wavelength range of 410–710 nm will be within +30% of its average, and that the light transmittance in the wavelength range of 410–750 nm will be not more than 2% when two of said polarizing films are put one upon the other so that their polarizing axes extend perpendicularly to each other. The polarizing composite includes a pair of light-transmissive sheets or lenses and a polarizing film sandwiched between the sheets or lenses. The film and the sheets or lenses contain colorants so that the light transmittance satisfies the above conditions.

5 Claims, 7 Drawing Sheets

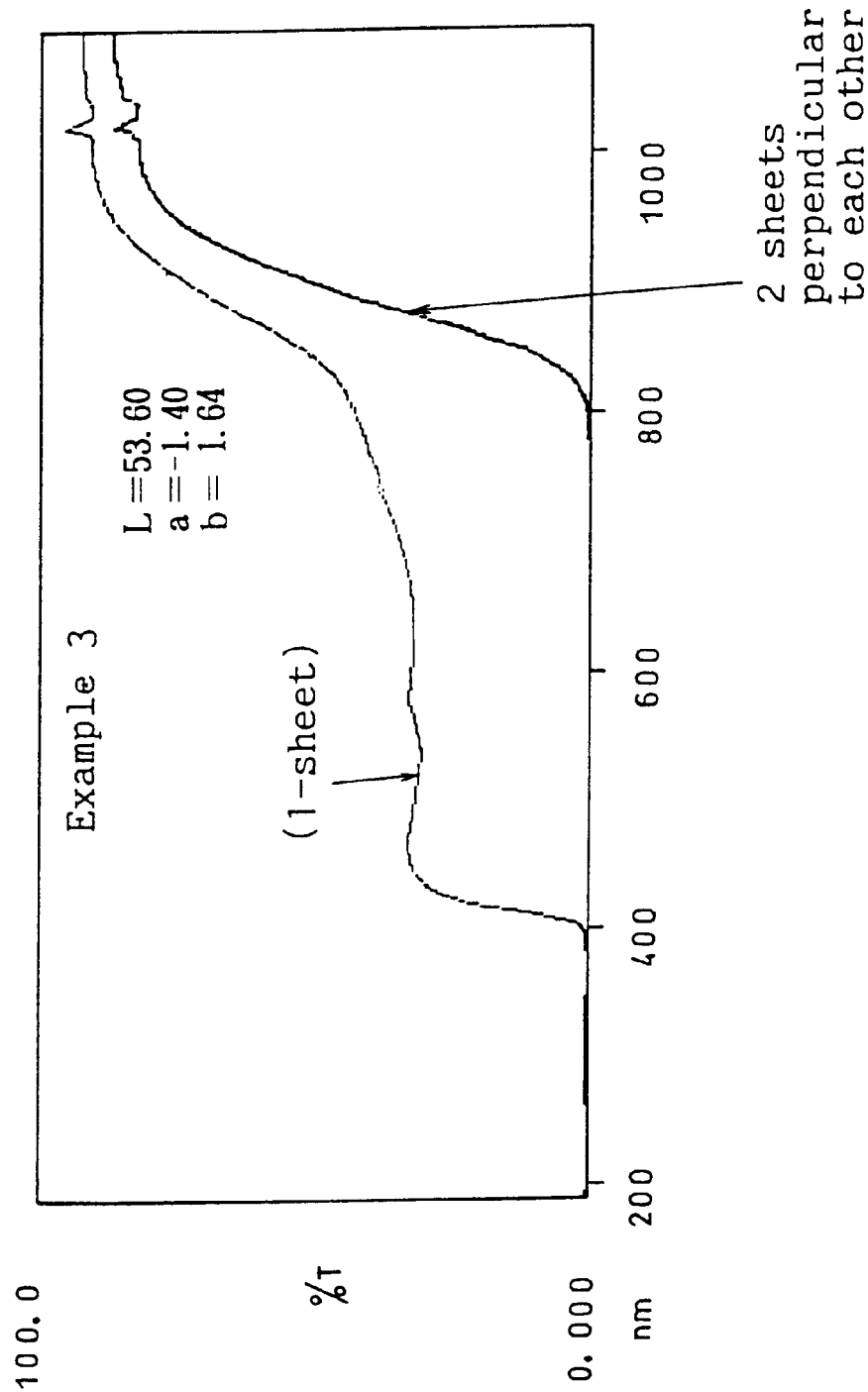

POLARIZING FILM AND POLARIZING COMPOSITES

BACKGROUND OF THE INVENTION

This invention relates to a polarizing film widely used in optical products that utilize polarization such as polarizing glasses and liquid crystal displays, and polarizing composites comprising a polarizing film and lenses or sheets laminated on the polarizing film.

Polarizing lenses mounted on polarizing glasses are used to eliminate glare of light (polarized light formed when reflected obliquely from objects). Such lenses have a polarizing film laminated between glasses or plastic sheets.

A polarizing film used for such a polarizing lens is formed by stretching a thin film of e.g. polyvinyl alcohol to about three- to five-fold in length and dyeing the thus stretched film with iodine or a dichroic dye. Most polarizing films are grayish brown or grayish green in color.

Such polarizing films or lenses or sheets including polarizing films are used for, besides polarized glasses, glasses for viewing three-dimensional motion pictures, cameras, strain gauges, liquid crystal displays, show windows, TV OA monitors, illumination adjusting windows, etc. They are also used outdoors such as in orchards and fish farms, or in high-illumination environments such as in printing works.

Conventional polarizing films are dyed with e.g. iodine, so that light passing through such films, lenses and sheets contains various colors such as blue and brown originating from colorants. Such colors naturally differ from the colors perceptible to the naked eye. That is, the colors of objects seen through polarizing films, lenses or sheets are more difficult to distinguish than when seen by the naked eye.

Thus, use of polarizing films, lenses and sheets poses various problems. For example, in orchards, farmers with polarizing glasses on may have a hard time in distinguishing ripe fruits from unripe ones even when they consult color samples. Fish growers wearing polarizing glasses cannot know the real colors of colored carp and other aquarium fish. Similarly, for outdoor painters and printshop workers, the colors of objects to be sketched or print surfaces will look differently if they are seen through polarizing films, lenses or sheets.

An object of this invention is to provide a polarizing film or composite which can eliminate glare of the light reflected by an object and enables one to discriminate the color of the object as when seen by naked eye.

SUMMARY OF THE INVENTION

According to this invention, there is provided a polarizing film which is color-adjusted so that the color coordinates L, a and b in the UCS color space (where L is the brightness divided into 0 to 100 sections: if represented in terms of tristimulus values X, Y and Z in the standard calorimetric system CIE, $L=100Y^{1/2}$, $a=175(1.02X-Y)y^{-1/2}$, $b=70(Y-0.847Z)y^{-1/2}$) will be $22 \leq L \leq 70$, $-2.0 \leq a \leq 2.0$, $-2.0 \leq b \leq 2.0$, that the light transmittance in the wavelength range of 410–750 nm will be within ±30% of its average, and that the light transmittance in the wavelength range of 410–750 nm will be not more than 2% when two of the polarizing films are put one upon the other so that their polarizing axes extend perpendicularly to each other.

There is also provided a polarizing composite comprising a pair of light-transmissive sheets or lenses and a polarizing film laminated between the sheets or lenses, the film or the sheets or lenses containing a colorant so that the color coordinates L, a and b in the UCS color space (where L is the brightness divided into 0 to 100 sections: if represented in terms of tristimulus values X, Y and Z in the standard colorimetric system CIE, $L=100Y^{1/2}$, $a=175$ $(1.02X-Y)$ $Y^{-1/2}$, $b=70$ $(Y-0.847Z)$ $Y^{-1/2}$) will be $22 \leq L \leq 70$, $-2.0 \leq a \leq 2.0$, $-2.0 \leq b \leq 2.0$, that the light transmittance in the wavelength range of 410–750 nm will be within ±30% of its average, and that the light transmittance in the wavelength range of 410–750 nm will be not more than 2% when two of the polarizing composites are put one upon the other so that their polarizing.

There is also provided a polarizing composite comprising a pair of light-transmissive sheets or lenses and a polarizing film sandwiched between the sheets or lenses, the film or the sheets or lenses containing a colorant and an ultraviolet absorber so that the color coordinates L, a and b in the UCS color space (where L is the color brightness divided into 0 to 100 sections: if represented by tristimulus values X, Y and Z in the standard colorimetric system CIE, $L=100Y^{1/2}$, $a=175(1.02X-Y)Y^{-1/2}$, $b=70(Y-0.847Z)Y^{-1/2}$) will be $22 \leq L \leq 70$, $-2.0 \leq a \leq 2.0$, $-2.0 \leq b \leq 2.0$, that the light transmittance in the wavelength range of 430–750 nm will be within ±30% of its average, and that the light transmittance in the wavelength range of 430–750 nm will be not more than 2% when two of the polarizing composites are put one upon the other so that their polarizing axes extend perpendicularly to each other.

There is also provided polarizing glasses provided with any of the above-described polarizing composites.

The above-described color-adjusted polarizing film or composite can polarize light having a wavelength of 410–750 nm, which substantially coincides with the wavelength range of the light the human eye can see, i.e. the range of 380–780 nm. Light passing through this film or composite is colored so that the color coordinates L, a and b in the UCS (uniform color space) will be within the above-defined ranges.

The UCS is a color space including a plane of a UCS (uniform chromaticity scale) diagram and a brightness axis extending through the origin of the UCS diagram perpendicularly to the UCS diagram.

For color adjustment, the polarizing film is colored by adding predetermined amounts of such colorants as iodine for imparting polarization and additional colorants such as direct dyes, reactive dyes and acid dyes so that the L, a and b values will be within the above-described ranges, while imparting necessary polarizing characteristics to the film.

By color-adjusting the film in the above manner, the light transmittance of the light passing through the polarizing film in the wavelength range of 410–750 nm will be within ±30% of its average. That is, the polarizing film passes light of every wavelength instead of passing light of a particular wavelength only so that the transmittance of light of different wavelengths stabilizes within ±30% of the average.

In this coloring adjustment, it is also important that the transmittance of light having a wavelength of 410–750 nm be 2% or less when the light passes through two such polarizing films put one upon the other so that their polarizing axes extend perpendicularly to each other. This is necessary because even if the L, a and b values are in the predetermined ranges and the light transmittance in the predetermined range is stable within ±30% of the average when natural light hits an object and one sees the reflected light through a polarizing film, light of a certain wavelength may be contained in a relatively large quantity. Therefore, it is necessary to suppress the transmittance of such light so that the light passing through the films will be as near to natural light as possible.

Light passing through the thus color-adjusted polarizing film or films contains lights of all the wavelengths uniformly, so that such light allows one to discern the original color of an object, like when seen by the naked eye, though its brightness lowers a little.

In the case of a polarizing composite comprising light-transmissive sheets or lenses and a polarizing film laminated between the sheets or lenses, colorants for color adjustment are also added to at least one of the polarizing film, sheet and lens so that light passing through the polarizing composite will uniformly contain lights of all the wavelengths within the range perceptible to the human eye in the same manner as the polarizing film.

By adding ultraviolet absorbers, as well as colorants, to a polarizing composite, the polarizing composite can cut off ultraviolet rays naturally. If the ultraviolet absorbers added are of such a type that can absorb lights in the near-visible wavelength range of 410–430 nm, it becomes difficult to stabilize light transmission in the range from 410–750 nm. But even in such a case, if the light transmittance in the wavelength range of 430–750 nm is within ±30% of the average, the polarizing composite is practically usable.

In this case, too, it is necessary to adjust coloring so that the light transmittance within the abovementioned wavelength range is 2% or less when two polarizing composites are put one upon the other so that their polarizing axes extend perpendicularly to each other. The polarizing film or composite thus formed makes it possible to perceive the color of an object as exactly as when seen by the naked eye while cutting off ultraviolets.

Other features and objects of the present invention will become apparent from the following description made with reference to the accompanying drawings, in which:

BRIEF DESCRIPTION OF THE DRAWINGS

FIG. 8 is a similar graph for Example 3.

DETAILED DESCRIPTION OF THE PREFERRED EMBODIMENT

Figure 1:
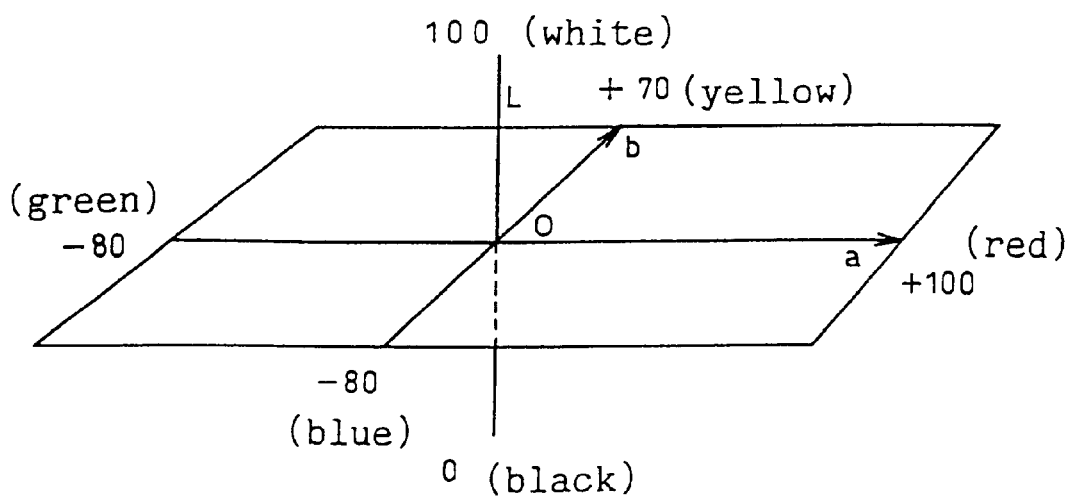
FIG. 1 is a view illustrating the color solid in the UCS color space.

The coordinate values L, a and b in the UCS color space according to this invention are values on a coordinate as shown in FIG. 1 to recognize as a three-dimensional color solid. They can be measured by a known photoelectric colorometer (photoelectric tube including a light interceptor in the form of a photocell) for measuring color differences. Such a color-difference meter may be one invented by Richard S Hunter and known as "color and color-difference meter", or home-made one.

Of these coordinate values, L is a brightness divided into 0–100 sections. If represented in terms of tristimulus values X, Y and Z in the standard colorimetric system CIE, values L, a and b will be $L=100Y^{1/2}$, $a=175(1.02X-Y)Y^{-1/2}$, $b=70(Y-0.847Z)Y^{-1/2}$. Tristimulus values of light can be measured by spectrometry and are represented in terms of the letters X, Y and Z according to the rules of the International Commission on Illumination.

Colorants used in this invention may be, besides iodine, known direct dyes, reactive dyes or acid dyes.

Direct dyes include Dia Luminous Blue GF, Kayarus Supra Green GG, Sirius Supra Brown G, Sumilight Black G, Direct Fast Black D, Kayarus Supra Grey CGL, Sumilight Red 4B, Sirius Scarlet B, Direct Fast Yellow R, Direct Fast Orange, Nippon Orange GG, Direct Orange GK, etc.

Reactive dyes include Mikacion Yellow RS, Mikacion Yellow GRS, Diamira Yellow RTN, Diamira Brilliant Orange GD, Mikacion Scarlet GS, Diamira Red B, Diamira Brilliant Violet 5R, Mikacion Brilliant Blue RS, Mikacion Olive Green 3GS, etc.

Acid dyes include Kayakalan Yellow GL, Kayanol M Yellow RW, Daiwa Acid Orange I, Kayakalan Orange RL, Sumitomo Fast Scarlet A, Brilliant Scarlet 3R, Kayanol M Red BW, Brilliant Acid Blue R, Dia Acid Fast Blue NP, Kayanol M Blue BW, Sumilan Green BL, Kayakalan Olive BGL, etc.

These dyes may be used in combination.

Stretchable film materials that can be used for the polarizing film according to the invention include polyvinyl alcohol film, polyvinyl chloride film, and polyethylene terephthalate.

The thickness of film before being stretched and the degree of stretching are not limited. But a polarizing film formed by uniaxially stretching a 75 μm-thick film to three- to five-fold in length will show good polarizing characteristics. To color the thus stretched polarizing film with one or more of the abovementioned dyes, after stretched, the film is immersed in a dye solution, treated with boric acid or borax, dried and heated.

In order to produce a polarizing composite, it is possible to color at least one of light-transmissive sheet, lens and adhesive as a component of the composite other than the polarizing film. The sheet or lens of such a polarizing composite may be provided with a surface coating formed e.g. by vacuum mirror treatment, ion plating or colorant transfer. Thus, it is possible to use a colored coating agent. To color the adhesive, an oil dye is preferable because it is high in heat resistance and solubility. Commercially available oil dyes include Diaresin Yellow A, Diaresin Orange K and Diaresin Red J.

The sheet and lens materials are not limited. They may be made e.g. from such a thermoplastic resin as cellulose diacetate, cellulose triacetate, cellulose acetate butyrate (CAB), cellulose propionate, polycarbonate, methylmethacrylate (MMA), polyester or polyolefin, or from such a thermosetting resin as diethylene glycol bisallyl carbonate, ethylene glycol diacrylate, methacrylate ester, or acryl styrol/urethane copolymer.

Figure 2:
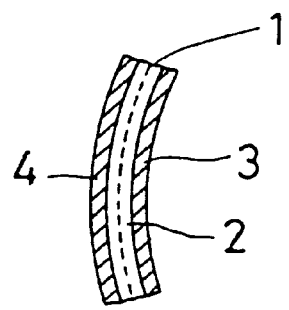
FIG. 2 is an enlarged sectional view of a polarizing composite.

In order to produce a polarizing composite having a polarizing film and lenses or sheets, as shown in FIG. 2, a polarizing film 1 may be held through an adhesive 2 between a pair of lenses or sheets 3, 4. Instead of using an adhesive, a polarizing composite may be produced by injection-molding a thermoplastic resin with a polarizing plate in a mold for injection molding.

If the above predetermined conditions for color adjustment are met, a known coating may be formed on the surface of the polarizing composite. Such a coating may be a hard coat, multiple coat, fog-proof coat, drip-proof oat, UV coat, IR coat, split coat or half dyeing.

Coloring adjustment that satisfies the abovementioned conditions including L, a and b values should be made mainly for the polarizing film, but may be made for the adhesive, sheet or lens (or their surface coatings).

[Example 1]

A polyvinyl alcohol film (generally known as VINYLON film) with 75 $\mu$m thickness was uniaxially stretched four-fold. The thus stretched film was immersed in an aqueous solution (dye solution) containing 0.1 wt % iodine, 0.02 wt % Sirius Scarlet B and 0.04 wt % Direct Fast Orange as direct dyes, and 0.01 wt % Mikacion Yellow RS and 0.012 wt % Diamira Red B as reactive dyes, and then in an aqueous solution containing 3 wt % boric acid. Then, after removing water content, the film was heated for five minutes at 70° C. A plurality of polarizing films (30 $\mu$m thick) were thus obtained.

For one of the polarizing films obtained, the coordinate values L, a and b in the UCS color space were measured with a device comprising Σ90 color measuring system and Z-II optical sensor made by Nippon Denshoku Kogyo Co., Ltd., and the light transmittance within the wavelength range of 410–750 nm was measured with a U-2000 spectrophotometer made by HITACHI. Further, the light transmittance with two polarizing films put one upon the other so that their polarizing axes would be perpendicular to each other was measured. The results of measurements are shown in FIG. 3.

Figure 3:
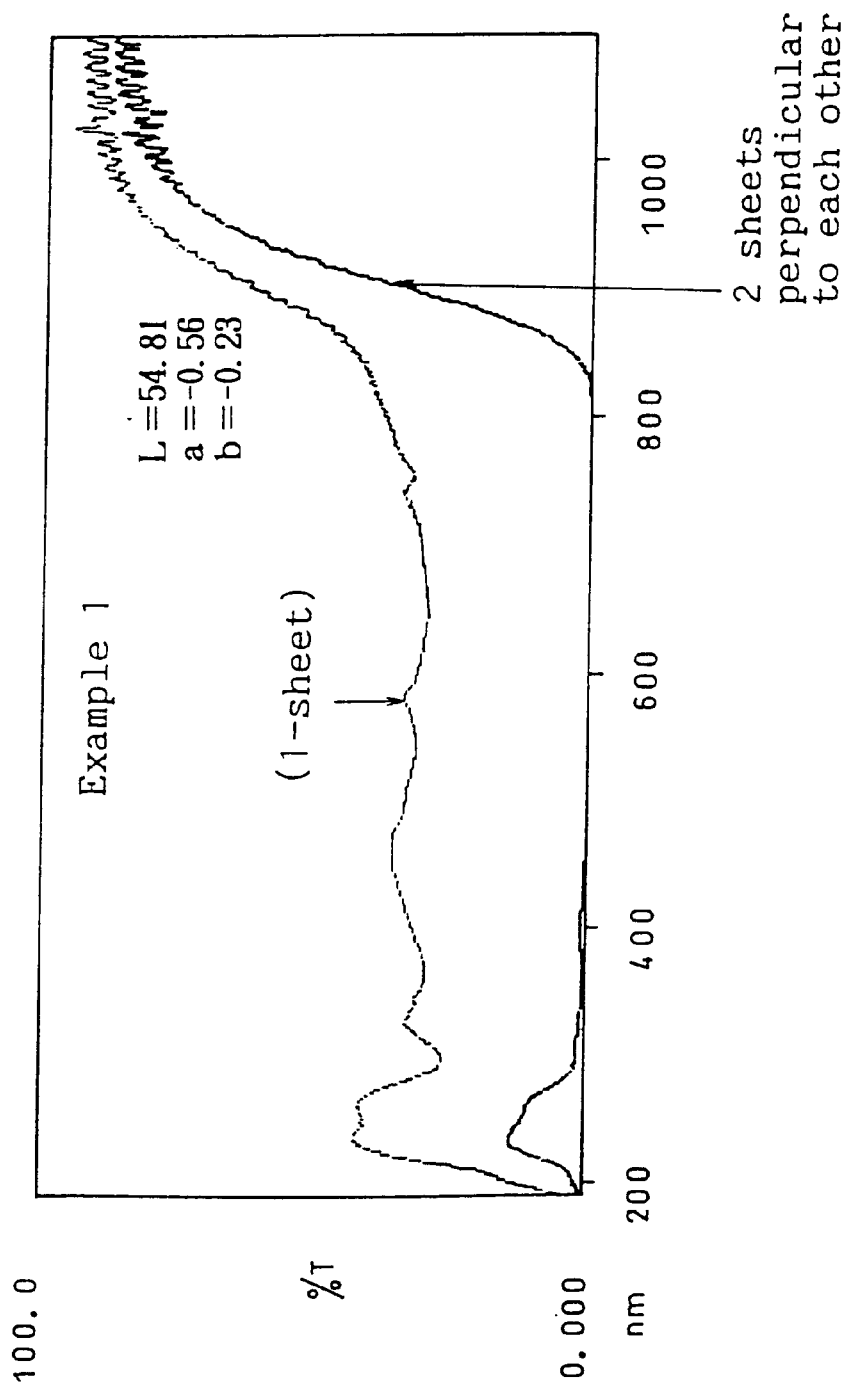
FIG. 3 is a graph showing the relationship between the wavelength and the transmittance of the transmitted light in Example 1.

As shown in FIG. 3, L=54.81, a=–0.56 and b=–0.23 for Example 1 are all within the predetermined ranges. The light transmittance (T%) in the above wavelength range was 31.95% on the average and fluctuated from –7.7% to +10.8% (i.e. within +30% of the average). This clearly shows that light passing through the polarizing film uniformly contains lights of all the wavelengths visible to the naked eye. The light transmittance in the wavelength range of 410–750 nm when two polarizing films were put one upon the other so that their polarizing axes would extend perpendicularly to each other was 0.0–0.8% (i.e. 2% or less), which means that it is possible to perceive the color of an object as correctly as when viewed by the naked eye. The polarizing film can thus be used for polarizing glasses.

[Example 2]

The same polarizing film used in Example 1 was formed into a curved shape by pressing it against the surface of a glass ball. An urethane adhesive (Polynate 1000 made by Tokyo Polymer Co., Ltd.) was applied to both outer and inner surfaces of the thus formed curved film and dried. Then, with the film placed in the center of a gasket and glass molds set on both sides of the film, an agitated mixture of a liquid monomer of ADC resin (diethylene glycol bisallyl carbonate), which is a thermosetting resin, and 3 wt % IPP (diisopropylperoxydicarbonate) as a catalyst were poured into the space between the polarizing film and the glass molds. They were heated form 20° C. to 80° C. at a constant rate, taking 12 hours. Polarizing composites (lenses) were thus formed.

For one of the polarizing lenses obtained, the coordinate values L, a and b, and the light transmittance within the wavelength range of 410–750 nm were measured. Further, the light transmittance when two polarizing lenses were put one upon the other so that their polarizing axes would be perpendicular to each other was measured. The results of measurements are shown in FIG. 4.

Figure 4:
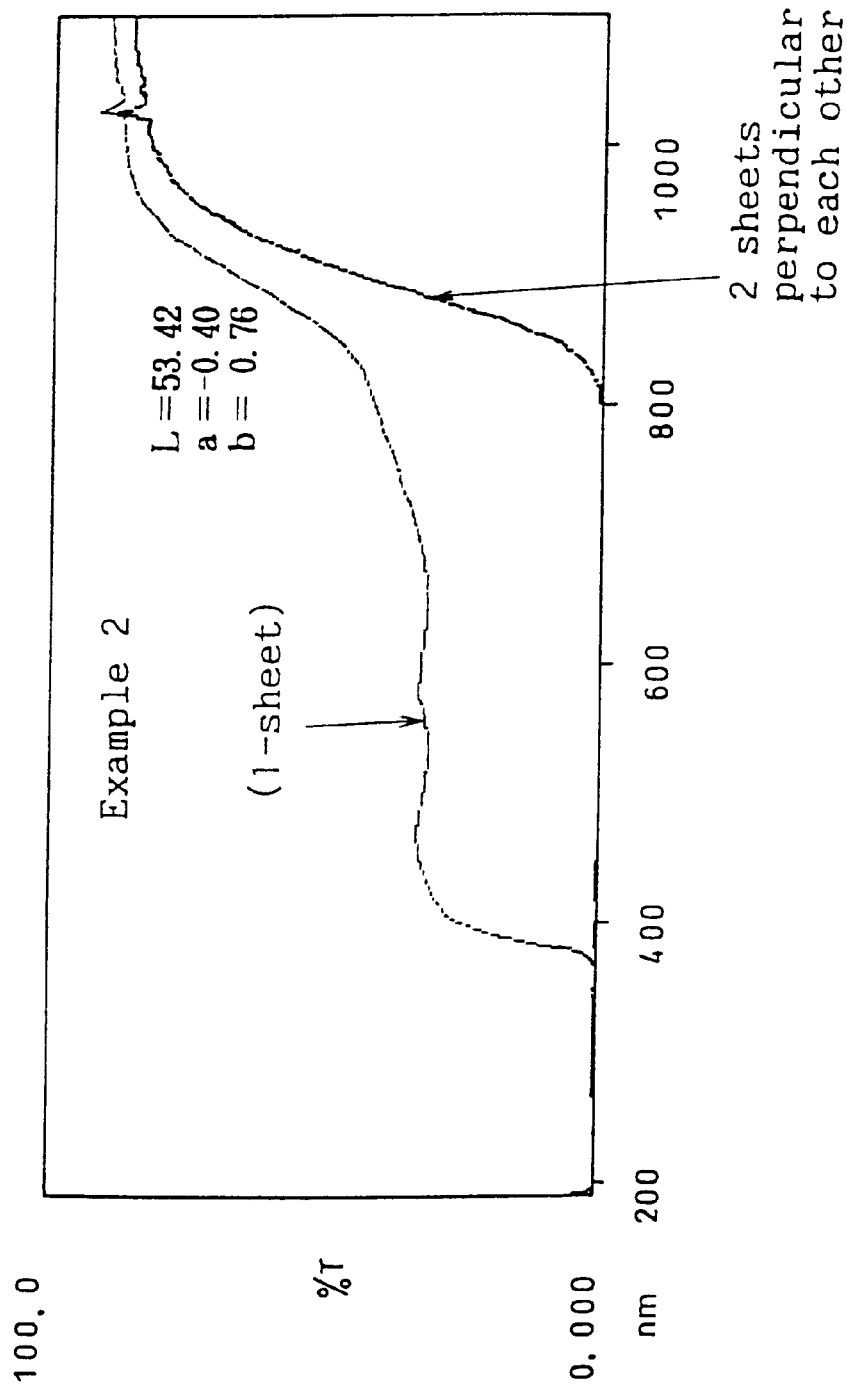
FIG. 4 is a similar graph for Example 2.

As shown in FIG. 4, L=53.42, a=–0.40 and b=0.76 for Example 2 are all within the predetermined ranges. The light transmittance (T%) in the above wavelength range was 31.41 on the average and fluctuated from –21.4% to +15.9% (within +30% of the average). The light transmittance in the wavelength range of 410–750 nm when two polarizing lenses were put one upon the other so that their polarizing axes would extend perpendicularly to each other was 0.0–0.2% (i.e. 2% or less). This means that it is possible to perceive the color of an object as correctly as when viewed by the naked eye. The polarizing film can thus be used for polarizing glasses.

[Comparative Example 1]

Polarizing films (30 $\mu$m thick) were made from polyvinyl alcohol film in exactly the same manner as in Example 1 except that only iodine was used.

For one of the polarizing films obtained, the color coordinate values L, a and b, and the light transmittance within the wavelength range of 410–750 nm were measured. Further, the light transmittance when two polarizing lenses were put one upon the other so that their polarizing axes would be perpendicular to each other was measured. The results of measurements are shown in FIG. 5.

Figure 5:
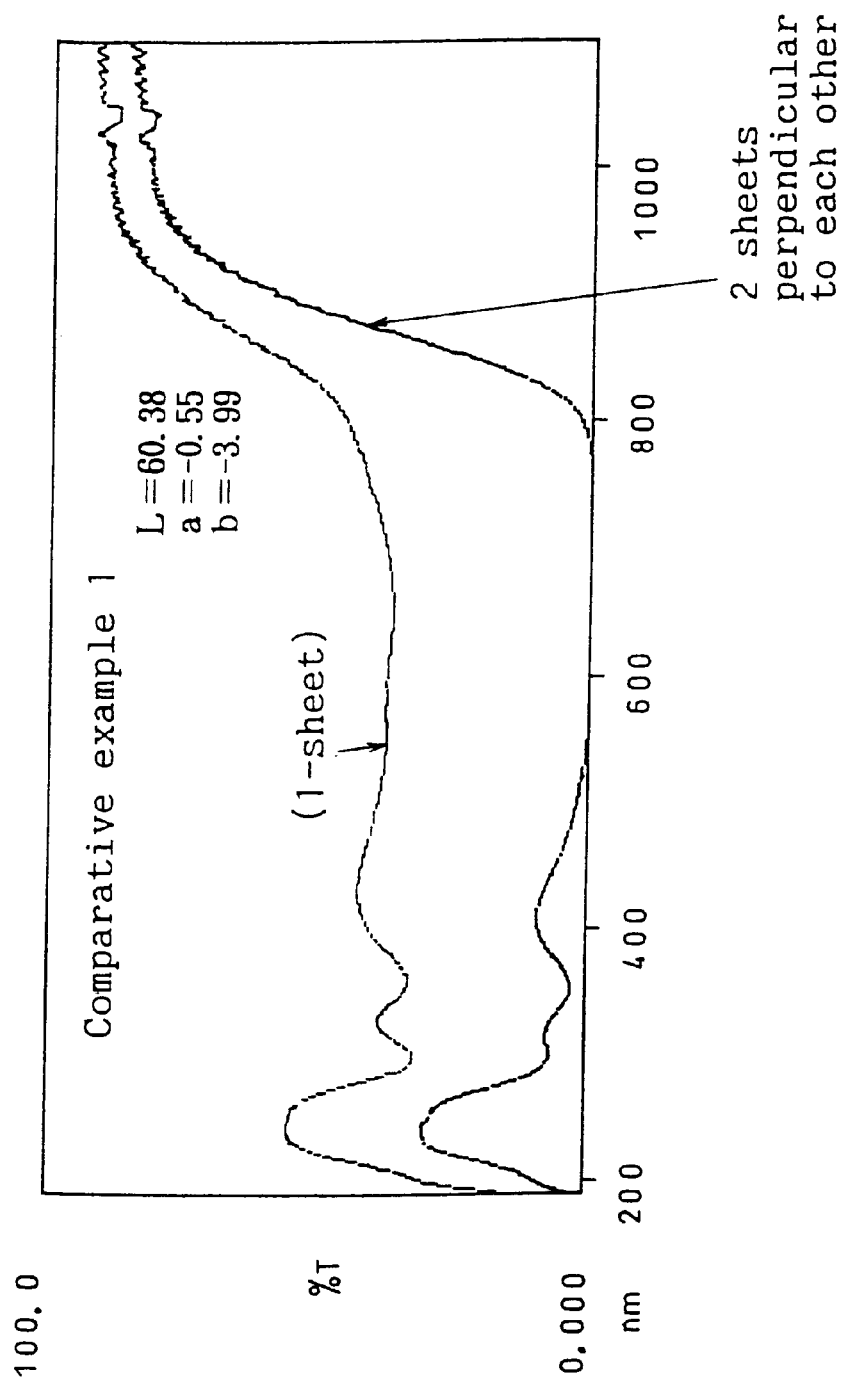
FIG. 5 is a similar graph for Comparative Example 1.

As shown in FIG. 5, the values L, a and b for Comparative Example 1 were L=60.38, a=–0.55 and b=–3.99. Of these values, value b was out of the predetermined range. The light transmittance (T%) in the above wavelength range was 38.38% on the average and fluctuated from –6.5% to +6.8%, i.e. within ±30% of the average. The light transmittance was thus stable. But the light transmittance in the wavelength range about 450 nm when two polarizing films were put one upon the other so that their polarizing axes would extend perpendicularly to each other was 5.4%, i.e. higher than 2%, the predetermined upper limit. Further, when an object was seen through the polarizing film of Comparative Example 1, the blue component was felt too strong, though no "glare" was felt.

[Comparative Example 2]

Polarizing composites (lenses) were prepared which comprise a polarizing film that uses only a direct dye while not using iodine as a polarizing agent, and polycarbonate resin lenses bonded to both sides of the film.

For one of the polarizing composites obtained, the coordinate values L, a and b, and the light transmittance within the wavelength range of 410–750 nm were measured. Further, the light transmittance when two polarizing composites were put one upon the other so that their polarizing axes would be perpendicular to each other was measured. The results of measurements are shown in FIG. 6.

Figure 6:
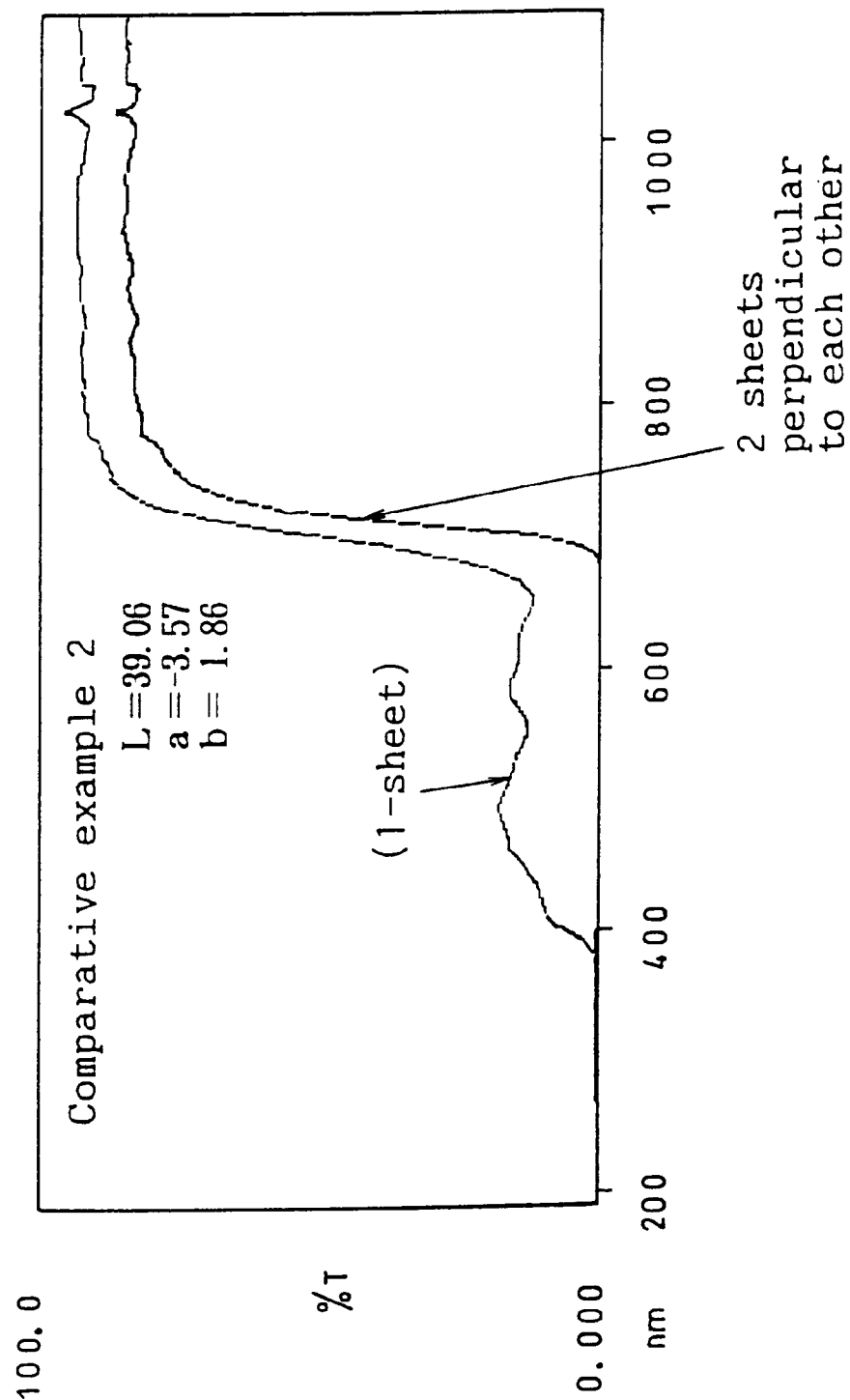
FIG. 6 is a similar graph for Comparative Example 2.

As shown in FIG. 6, the values L, a and b for Comparative Example 2 were L=39.06, a=–3.57 and b=1.86. Of these values, value a was out of the predetermined range. The light transmittance (T%) in the wavelength range of about 700–750 nm fluctuated from –73.9 to +232, i.e. out of the +30% range of the average value (26.08). Further, the light transmittance in the wavelength range 700–750 nm when two polarizing films were put one upon the other so that their polarizing axes would extend perpendicularly to each other was 74.6% at 750 nm, i.e. higher than 2%, the predetermined upper limit. Further, when an object was seen through this polarizing lens, the red component was felt strong, though no "glare" was felt. Thus, it is impossible to see the true color of an object, i.e. as correctly as when seen by the naked eye.

[Comparative Example 3]

Polarizing composites (lenses) were prepared which comprise a polarizing film that uses iodine and a colorant as polarizing agents, and two cellulose resin lenses bonded to both sides of the film.

For one of the polarizing composites obtained, the coordinate values L, a and b, and the light transmittance within the wavelength range of 410–750 nm were measured. Further, the light transmittance when two polarizing composites were put one upon the other so that their polarizing axes would be perpendicular to each other was measured. The results of measurements are shown in FIG. 7.

Figure 7:
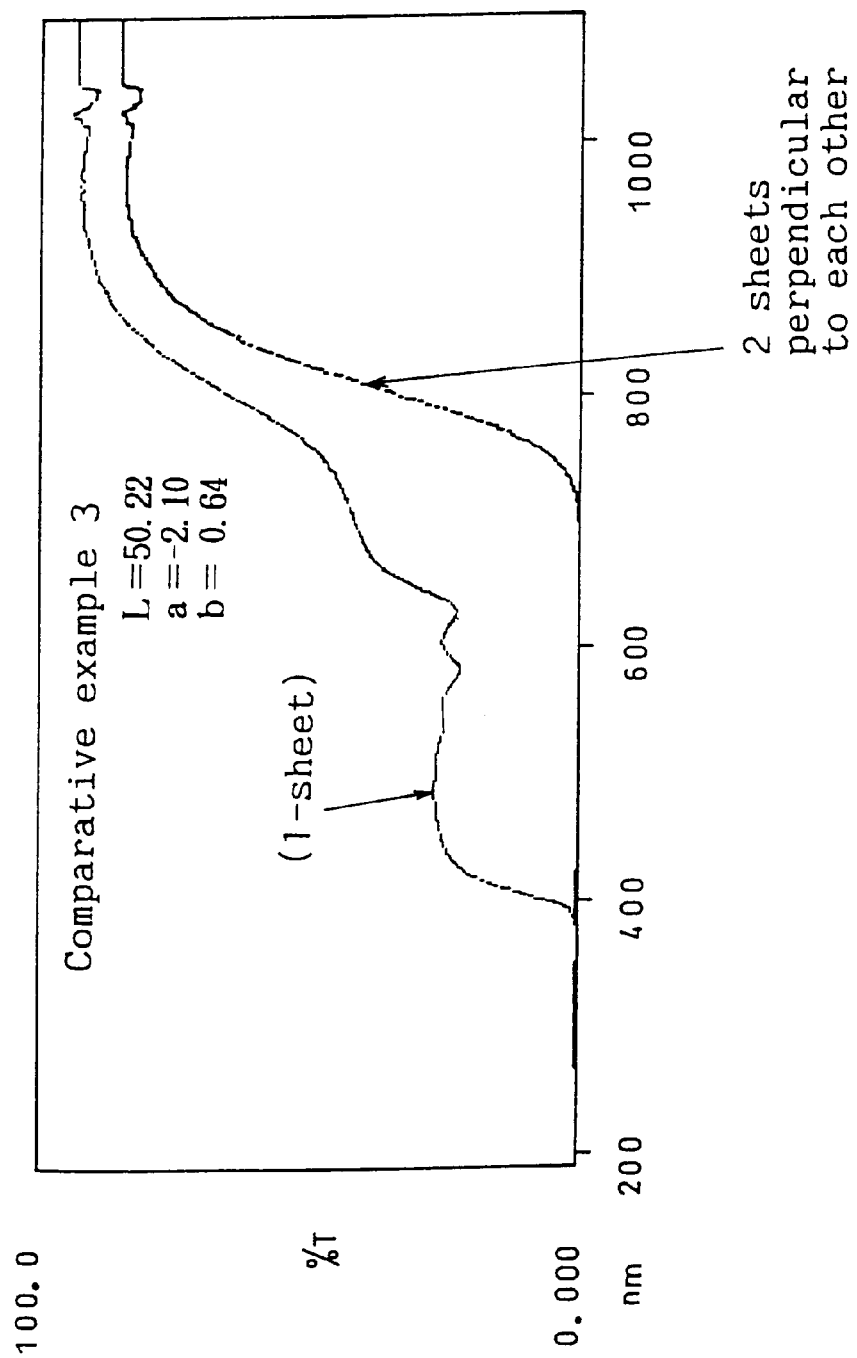
FIG. 7 is a similar graph for Comparative Example 3.

As shown in FIG. 7, the values L, a and b for Comparative Example 3 were L=50.22, a=−2.10 and b=0.64. Of these values, value a was out of the predetermined range. The light transmittance (T%) in the wavelength range of about 650–750 nm fluctuated from −79.3% to +66.4%, i.e. out of the +30% range of the average value (28%). Further, the light transmittance in the wavelength range of 700–750 nm when two polarizing films were put one upon the other so that their polarizing axes would extend perpendicularly to each other was 5.4% at 750 mm, i.e. higher than 2%, the predetermined upper limit. Further, when an object was seen through this polarizing lens, the red component was felt too strong, though no "glare" was felt, as in Comparative Example 2. Thus, it is impossible to see the color of an object as correctly as when seen by the naked eye.

[Example 3]

Polarizing composites (lenses) were prepared in exactly the same manner as in Example 2 except that instead of a mixture of a liquid monomer of ADC resin and IPP used in Example 2, a mixture of a liquid monomer of ADC resin (diethylene glycol bisallyl carbonate) containing 0.3 wt % of ultraviolet absorber (Uvinul D-49 made by General Aniline & Film Co.) and 3 wt % IPP (diisopropylperoxydicarbonate) as a catalyst was used.

For one of the polarizing lenses obtained, the coordinate values L, a and b, and the light transmittance within the wavelength range of 430–750 nm were measured. Further, the light transmittance when two polarizing lenses were put one upon the other so that their polarizing axes would be perpendicular to each other was measured. The results of measurements are shown in FIG. 8.

As shown in FIG. 8, L=53.60, a=−1.40 and b=1.64 for Example 3 are all within the predetermined ranges. The light transmittance (T%) in the above wavelength range fluctuated from −6.2% to +15.2%, i.e. within ±30% of the average value (28%). The light transmittance in the wavelength range of 430–750 nm when two polarizing lenses were put one upon the other so that their polarizing axes would extend perpendicularly to each other was 0.2–0.4% (i.e. 2% or less). This means that it is possible to perceive the color of an object as correctly as when viewed by the naked eye. Such lenses can also protect eyes from ultraviolet rays. The polarizing film can thus be used for polarizing glasses (uv- and glare-proof sunglasses).

The polarizing film according to this invention is color-adjusted so that light passing therethrough has L, a and b values within the predetermined ranges, that the light transmittance in the predetermined wavelength range fluctuates upward or downward within the predetermined range of the average value, and that the light transmittance in the predetermined wavelength range when two polarizing films are put one upon the other is 2% or less. Thus, light passing through this film represents the true color of an object, i.e. the same color as seen by the naked eye.

The polarizing composite according to the present invention, which comprises the light-transmissive sheets or between which is laminated the polarizing film according to the invention has the same advantages as the above polarizing film.

The polarizing composite according to the invention in which colorants and ultraviolet absorbers are added to its components can show the true color of an object while while cutting ultraviolet rays.

What is claimed is:

1. A polarizing film which is color-adjusted so that the color coordinates L, a and b in a UCS color space, where L is the brightness divided into 0 to 100 sections, and in terms of tristimulus values X, Y and Z in a standard colorimetric system CIE, L=100$Y^{1/2}$, a=175 (1.02X−Y) $Y^{-1/2}$, b=70 (Y−0.847Z) $Y^{-1/2}$, will be 22≦L≦70, −2.0≦a≦2.0, −2.0≦b≦2.0, that light transmittance in a wavelength range of 410–750 nm will be within ±30% of its average, and that the light transmittance in the wavelength range of 410–750 nm will be not more than 2% when two of the polarizing films are put one upon the other so that their polarizing axes extend perpendicularly to each other.

2. A polarizing composite comprising a pair of light-transmissive sheets or lenses and a polarizing film laminated between the sheets or lenses, at least one of said film and said sheets or lenses containing a colorant so that the color coordinates L, a and b in a UCS color space, where L is the brightness divided into 0 to 100 sections, and in terms of tristimulus values X, Y and Z in a standard calorimetric system CIE, L=100$Y^{1/2}$, a=175 (1.02X−Y) $Y^{-1/2}$, b=70 (Y−0.847Z) $Y^{-1/2}$, will be 22≦L≦70, −2.0≦a≦2.0, −2.0≦b≦2.0, that light transmittance in a wavelength range of 410–750 nm will be within ±30% of its average, and that the light transmittance in the wavelength range of 410–750 nm will be not more than 2% when two of the polarizing composites are put one upon the other so that their polarizing axes extend perpendicularly to each other.

3. A polarizing glass provided with the polarizing composite as claimed in claim 2.

4. A polarizing composite comprising a pair of light-transmissive sheets or lenses and a polarizing film laminated between the sheets or lenses, at least one of said film and said sheets or lenses containing a colorant and ultraviolet absorber so that the color coordinates L, a and b in a UCS color space, where L is the color brightness divided into 0 to 100 sections, and in terms of tristimulus values X, Y and Z in a standard calorimetric system CIE, L=100$Y^{1/2}$, a=175 (1.02X−Y) $Y^{-1/2}$, b=70 (Y−0.847Z) $Y^{-1/2}$, will be 22≦L≦70, −2.0≦a≦2.0, −2.0≦b≦2.0, that light transmittance in wavelength range of 430–750 nm will be within ±30% of its average, and that the light transmittance in the wavelength range of 430–750 nm will be not more than 2% when two of the polarizing composites are put one upon the other so that their polarizing axes extend perpendicularly to each other.

5. A polarizing glass provided with the polarizing composite as claimed in claim 4.

* * * * *